Sept. 22, 1942.  G. P. MARSDEN  2,296,645

MELON ALIGNING AND SPACING CONVEYER

Filed July 17, 1941

INVENTOR:
GEO. P. MARSDEN

BY

ATTORNEY

Patented Sept. 22, 1942

2,296,645

UNITED STATES PATENT OFFICE 2,296,645

MELON ALIGNING AND SPACING CONVEYER

George P. Marsden, Los Angeles, Calif., assignor to Food Machinery Corporation, San Jose, Calif., a corporation of Delaware Application July 17, 1941, Serial No. 402,764

12 Claims. (Cl. 198—33)

This invention relates to the art of processing fresh whole fruit and preparing this for shipment to market, and particularly a device for feeding and aligning ovaloid fruit such as melons incidental to such processing.

While my invention is suitable for use with a large variety of fruits and vegetables of ovaloid shape, it is particularly suitable for handling melons and will accordingly be described as when so used.

For many years the processors of melons have endeavored to find a way to apply the shipper's brand to these melons and one of the things which has stood in the way of succeeding in this effort has been the difficulty of properly aligning the melons and feeding these to the marking machine.

It is accordingly an object of my invention to provide a melon feeding and aligning conveyer by which melons can be readily aligned and uniformly fed to a processing machine.

The problem aforementioned also involves the spacing of melons so fed a distance approximately equal to the diameter of the melons. With smaller fruit this problem is solved by isolating a piece of fruit in each valley between the rollers of a conveyer handling the fruit. In handling melons this solution is impractical as it would necessitate the provision of a conveyer with rollers abnormally large.

It is therefore an object of my invention to provide a means for feeding melons to a processing machine which will not only uniformly align these melons when delivering these to the machine, but which will deliver the melons uniformly spaced a distance substantially equal to the diameter of the melon.

The manner of accomplishing the foregoing objects, as well as further objects and advantages, will be made manifest in the following description taken in connection with the accompanying drawing, in which.

Figure 1:
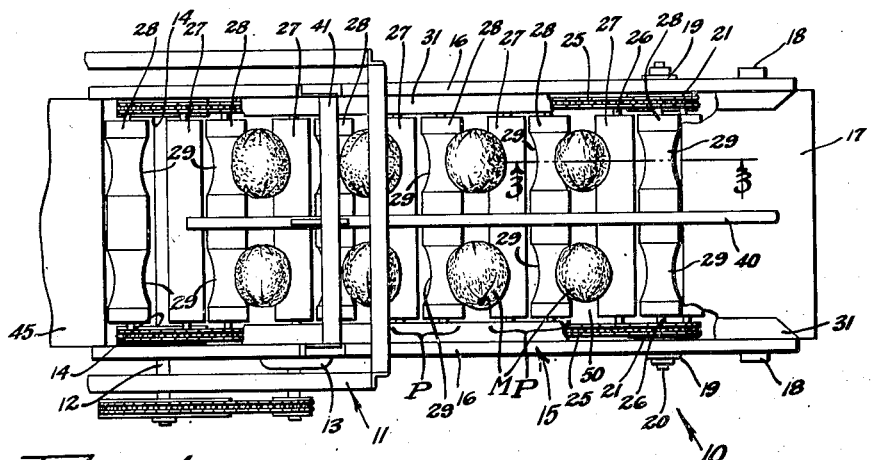
Fig. 1 is a plan view of a preferred embodiment of the melon aligning and spacing conveyer of my invention.
Figure 2:
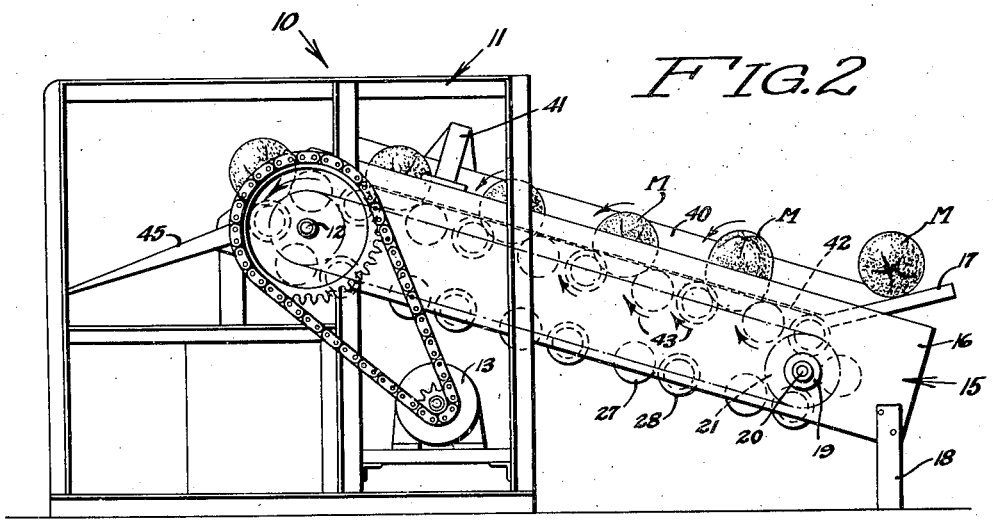
Fig. 2 is a side elevational view of Fig. 1.
Figure 3:
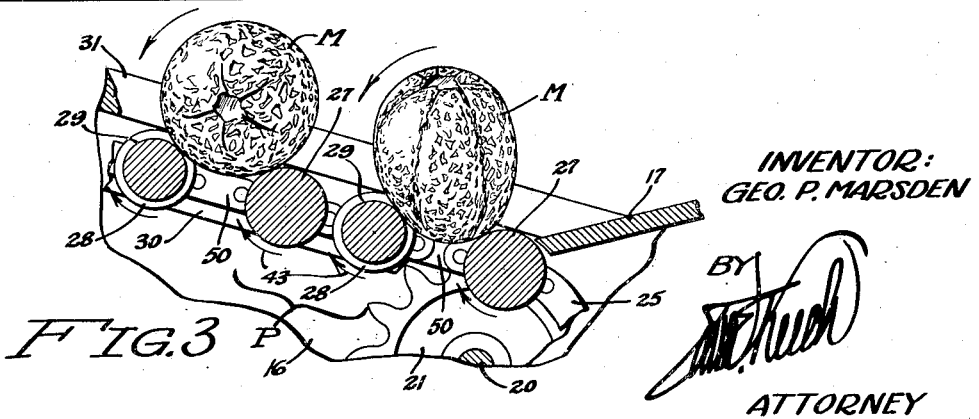
Fig. 3 is a fragmentary enlarged operational sectional view taken on the line 3—3 of Fig. 1.

The illustrated embodiment comprises a conveyer 10 including a frame 11 on which is rotatably mounted a shaft 12 driven by a motor 13. Fixed on the shaft 12 are sprockets 14 while pivotally mounted on this shaft is one end of a conveyer bed 15. This bed includes side members 16 which are united at their lower ends by a delivery board 17 and are provided with legs 18 which rest on the floor and support the lower end of the bed. Pivotally mounted on the board 16 near the lower ends is an idle conveyer shaft 20 having sprockets 21. Trained about the sprockets 14 and 21 are conveyer chains 25 having inwardly extending pins 26 on which are rotatably mounted rollers 27 and 28. Rollers 27 are cylindrical and the rollers 28 have shallow annular channels 29 formed therein. These rollers are disposed in pairs P, one roller 27 and one roller 28 being included in each such pair. The distance between the roller 27 and the roller 28 in each pair P is substantially less than the distance between each pair P and the pairs of rollers adjacent thereto.

The upper runs of the chains 25 are supported by tracks 30 provided on the inner faces of the boards 16 while triangular guard moldings 31 are fixed to the upper inner edges of the side board 16 to cover the chains 25 and keep any small fruit from getting off the rollers 27 and 28. Mounted centrally over the conveyer 10 is a septum board 40 the lower end of which is supported on the delivery board 17 and the upper end of which is supported by a bracket 41 provided on the side boards 16. This board has a friction shoe 42 provided along its lower edge which engages each of the rollers 27 and 28 in the upper run of the elevator 10 so as to cause these rollers to rotate in the direction of the arrows 43 when the conveyer is in operation.

Provided on the frame 11 is a dropboard 45 for receiving melons discharged from the upper end of the conveyer 10.

It is to be noted that the conveyer 10 is set at a slight upward inclination. This inclination, together with the reverse rotation of the rollers in the upper flight of the conveyer, the arrangement of these rollers in pairs, the channeling of the rearmost roller in each pair, and the spacing of the pairs greater distances apart than the rollers in each of the pairs are spaced from each other, are factors which combine to produce the novel advantages possessed by my invention.

It is to be noted in the drawing that melons M traveling on the conveyer 10 are riding in the spaces between adjacent pairs of rollers in what may be termed pockets 50. In operating the conveyer 10, the melons M are fed promiscuously over the delivery board 17 to the conveyer with no regard for timing or positioning the melons with respect to the conveyer. Owing to the inclination of the conveyer, the arrangement of the rollers, and the channeling of the rearmost roller of each pair P, the melons do not come to rest in the valley between the rollers of any pair P of rollers but uniformly come to rest in the pockets 50. This causes the melons on the conveyer always to be uniformly spaced apart distances equal to the spacing of the centers of adjacent pockets 50.

The reverse rotation of the conveyer rollers taken together with the contacting of each melon in one of the pockets 50, by a channeled roller surface on the roller 28 of this pocket and by a cylindrical surface on the roller 27 of that pocket, effects a rapid alignment of this melon so that its axis is parallel with the axes of the conveyer rollers. The melons M are also aligned centrally with respect to the channels 29 so that the melons on each side of the septum board 40 travel in a straight line parallel with this board.

The conveyer 10 also performs the important function of preventing the piling up of melons more than one deep on the conveyer, this function resulting from the inclination of the conveyer and the reverse rotation of the conveyer rolls in the upper run thereof. Thus, no matter how deeply melons are fed over the delivery board 17 to the receiving end of the conveyer, the conveyer automatically rejects rearwardly any excess of melons over those necessary to place one melon in each successive pocket 50.

It is thus seen that I have provided a conveyer by which melons may be uniformly aligned and spaced at distances substantially equal to the diameters of the melons and thus delivered to a given point for any desired purpose such as the trade-marking of these melons with a stamping machine.

While I have shown only a single embodiment of my invention it is to be understood that various changes and modifications might be made in this without departing from the spirit of the invention or the scope of the appended claims.

What I claim is:

1. A fruit feed conveyer comprising: a pair of spaced endless chains; an endless series of rollers pivotally suspended at their ends between said chains in pairs, the rollers of each pair being closer together than the distance separating that pair from adjacent pairs; and means for mounting and driving said chains to cause a flight of said conveyer to travel upward at an inclination from horizontal, there being an annular channel formed in the lowermost roller of each of said pairs of rollers traveling upward in said flight to prevent fruit coming to rest between the rollers of a single one of said pairs.

2. A fruit feed conveyer comprising: a pair of spaced endless chains; an endless series of rollers pivotally suspended at their ends between said chains in pairs, the rollers of each pair being closer together than the distance separating that pair from adjacent pairs; and means for mounting and driving said chains to cause a flight of said conveyer to travel upward at an inclination from horizontal, there being an annular channel formed in the lowermost roller of each of said pairs of rollers traveling upward in said flight to prevent fruit coming to rest between the rollers of a single one of said pairs; and means for rotating said rollers as they travel upward in said flight.

3. A fruit feed conveyer comprising: a pair of spaced endless chains; an endless series of rollers pivotally suspended at their ends between said chains in pairs, the rollers of each pair being closer together than the distance separating that pair from adjacent pairs; and means for mounting and driving said chains to cause a flight of said conveyer to travel upward at an inclination from horizontal, there being an annular channel formed in the lowermost roller of each of said pairs of rollers traveling upward in said flight to prevent fruit coming to rest between the rollers of a single one of said pairs; and means for rotating said rollers reversely to their direction of travel.

4. A fruit feed conveyer comprising: a pair of spaced endless chains; an endless series of rollers pivotally suspended at their ends between said chains, the spaces between certain pairs of adjacent rollers of said conveyer comprising aligning pockets, the roller on one side of said pocket being cylindrical and the roller on the other side of said pocket having an annular channel so that the roller diameter at the bottom of said channel is substantially less than the diameter of said cylindrical roller; means for feeding fruit to said conveyer to be aligned and spaced thereon; and means for rotating the rollers in said conveyer forming said pockets to produce a differential between the peripheral speeds of said cylindrical and channeled rollers.

5. A fruit feed conveyer comprising: a pair of spaced endless chains; an endless series of rollers pivotally suspended at their ends between said chains, the spaces between certain pairs of adjacent rollers of said conveyer comprising aligning pockets, the roller on one side of said pocket being cylindrical and the roller on the other side of said pocket having an annular channel so that the roller diameter at the bottom of said channel is substantially less than the diameter of said cylindrical roller; means for feeding fruit to said conveyer to be aligned and spaced thereon; and means for rotating the rollers in said conveyer forming said pockets in the same direction and at a uniform speed to produce a differential between the peripheral speeds of said cylindrical and channeled rollers.

6. A combination as in claim 5 in which said conveyer is inclined upwardly and in which the channeled roller of each of said pockets is disposed on the upper side of said pocket.

7. A fruit feed conveyer comprising: a pair of spaced endless chains; an endless series of rollers pivotally suspended at their ends between said chains; the spaces between certain adjacent rollers of said conveyer comprising aligning pockets, the roller on one side of said pocket being cylindrical and the roller on the other side of said pocket having an annular channel so that the roller diameter at the bottom of said channel is substantially less than the diameter of said cylindrical roller; means for feeding fruit to said conveyer to be aligned and spaced thereon; and means for reversely rotating at a uniform speed the rollers in said conveyer forming said pockets to produce a differential in the peripheral speeds of the cylindrical and channeled roller of each of said pockets.

8. A fruit feed conveyer comprising: a pair of spaced endless chains; an endless series of rollers pivotally suspended at their ends between said chains, the spaces between certain adjacent rollers of said conveyer comprising fruit aligning pockets, the roller on one side of each of said pockets being cylindrical and the roller on the other side of said pocket having an annular channel; and means for rotating the rollers in said conveyer forming said pockets.

9. A combination as in claim 8 in which said conveyer is inclined upwardly and in which the direction of rotation of said rollers is reversely to the direction of travel of the rollers in the upper flight of said conveyer.

10. An aligning device for ovaloid articles, comprising: two members mounted horizontally and in parallel relation to form a supporting valley, one of said members being cylindrical, the other of said members presenting a channeled surface which widens said valley to form a fruit pocket in said valley; and means for rotating said cylindrical member to cause the surface thereof in said valley to move upwardly.

11. An aligning device for ovaloid articles, comprising: two members mounted horizontally and in parallel relation to form a supporting valley, one of said members being cylindrical, the other of said members presenting a channeled surface of rotation which widens said valley to form a fruit pocket in said valley; and means for rotating said members in the same direction to cause the surface of said cylindrical member in said valley to move upwardly.

12. An aligning conveyer for ovaloid articles, comprising: an endless series of pairs of members mounted horizontally and in parallel relation to form a series of fruit supporting valleys, the member on one side of each such valley being cylindrical, the member on the other side of said valley presenting a channeled surface which widens said valley to form a pocket in said valley; endless means on which said members are mounted to cause the latter to travel over a given path; and means for rotating the aforesaid cylindrical members so as to cause the surfaces of said cylindrical members to move upwardly in the respective valleys which said cylindrical members assist in forming.

GEORGE P. MARSDEN.